3,219,656
ALKYLPOLYALKOXYALKYL GLUCOSIDES AND PROCESS OF PREPARATION THEREFOR
Fred E. Boettner, Huntingdon Valley, Pa., assignor to Rohm & Haas Company, Philadelphia, Pa., a corporation of Delaware
No Drawing. Filed Aug. 12, 1963, Ser. No. 301,633
16 Claims. (Cl. 260—210)

This invention concerns glycosides and processes for the preparation thereof. In particular, it is concerned with glycosides in which the alcohol moiety has high molecular weight and the glycoside is surface active. More particularly, it concerns glycosides represented by the following structure:

$$R-O-C_6H_{11}O_5$$

where the $-C_6H_{11}O^5$ grouping represents the glucose structure (such glycosides are known as glucosides) and where R represents a member from the following:
(a) normal alkyl from $C_8$ to $C_{18}$,
(b) branched chain primary and secondary alkyl from $C_8$ to $C_{18}$, and
(c) $R'O(C_2H_4O)_x$—where R' can be normal alkyl from $C_8$–$C_{18}$; branched alkyl from $C_8$ to $C_{18}$; and R' can be mono- or dialkyl phenyl in which the alkyl groups can can be a total of $C_8$ to $C_{12}$ and $x$ represents an integer of 1 to 8.

The higher molecular weight alkyl glycosides are nonionic detergents which show high stable foams and which act as foam stabilizers for other surfactants. They are good emulsifiers and good wetting agents. The n-alkyl glucosides are readily biodegradable when tested in raw river water.

The prior art teaches that when the alcohol moiety is greater than $C_3$ to $C_4$, then the glucoside cannot be prepared by reacting the alcohol with glucose in the presence of an acid catalyst. This reaction of the lower alcohols with glucose in the presence of an acid is known as the Fischer method, and normally gives the alpha-isomers of glycosides.

The following reaction is the classical one for the preparation of the higher molecular weight glucosides:

Glucose is reacted with acetic anhydride to form glucose pentacetate. This is then reacted with HBr to give bromoglucose tetra-acetate which, in turn, is reacted with the high molecular weight alcohol in the presence of silver oxide. The resulting tetra-acetyl glucoside is then hydrolyzed with base to give the desired glucoside. This is the well-known Koenigs-Knorr method and gives rise to the beta-isomers of the glucosides. Another well-known method of preparing glucosides is that wherein glucose penta-acetate is reacted with zinc chloride and the alcohol or phenol to give the corresponding glucoside tetra-acetate which can be hydrolyzed in the presence of a base to the desired glucoside. Obviously, these two multiple-step synthetic methods are cumbersome and expensive.

U.S. Patent No. 2,606,186 shows the preparation of methyl glucoside using a dehydrated cation exchanger in the hydrogen form. It is strictly limited to methyl glucoside and the conventional or gel type cation exchange resins, such as sulfonated styrene-divinylbenzene. Under these reaction conditions no reaction with the higher molecular weight alcohols is obtained. As an example, dodecanol and glucose were heated in dimethyl formamide for two weeks at 60° C. in the presence of a conventional or gel type sulfonated styrene divinylbenzene copolymer which had a low divinylbenzene content, and all the dodecanol was recovered as such. In other words, there was no reaction.

Similar non-reactivity of glucose with the higher molecular weight alcohols was noted when using sulfuric acid, hydrochloric acid, or mercuric acetate as catalysts and dimethylformamide as solvent.

It has now been found that it is possible to prepare the higher molecular weight glucosides by a modified Fischer process. Because glucose is water-soluble and because the higher alcohols are almost, without exception, hydrophobic, solubility difficulties are encountered. Unique solvents, such as dimethylformamide or dimethylsulfoxide, can be employed, which apparently give partial solubility of both components. When the glucoside preparations are carried out in dimethylformamide with the newer macroreticular-structured sulfonic acid type cation exchanger, anhydrous and in the acid form, substantial yields of the higher molecular weight alkyl glucosides are obtained.

The macroreticular-structured sulfonic resins in the anhydrous form which are used as catalysts in the present invention are prepared by copolymerizing monomers, such as styrene and divinylbenzene, in the presence of a substance which is a solvent for the monomer mixture but does not swell nor is imbibed by the copolymers so formed. In the styrene-divinylbenzene type of resin, higher molecular weight alcohols and higher molecular weight hydrocarbons are excellent for the purpose. They are generally used in the amount of about 25% to 50% by weight, based on the total weight of the monomer mixture plus the substance. By copolymerizing in the presence of these substances, a macroreticular structure is developed in the copolymer, which structure imparts very high specific surface to the copolymer particle. It is generally most convenient to suspension copolymerize in an aqueous medium.

The production of these macroreticular-structured copolymers is set forth in detail in U.S. Patent No. 3,037,052, column 2, line 28 et seq. and this information is incorporated herein by reference.

These copolymers are then sulfonated using sulfuric acid, oleum or $SO_3$. They are then washed with distilled or deionized water until acid-free and dehydrated either by azeotroping with a liquid, such as toluene, or by heating in vacuum at 100° to 110° C. to constant weight.

It has been found that, in the presence of a macroreticular-structured sulfonic acid resin, anhydrous and in the acid form, the solubility difficulties can be overcome by employing the preferred process of the present invention. This process consists of dissolving glucose in methanol, in the presence of a macroreticular-structured sulfonic acid resin, anhydrous and in the acid form, and thereto adding n-butanol while the methanol is removed by distillation. When all the methanol is removed and the reaction mixture has dissolved in the n-butanol, the higher molecular weight alcohol is added and the n-butanol removed at the preferred temperature. In this process, the glucose is converted to methyl glucoside, which is then converted to butyl glucoside and finally to the desired surface-active higher molecular weight alkyl glucoside. Neither the methyl glucoside nor the butyl glucoside is isolated as such. In other words, a double alcohol interchange is employed. Since α-methyl-D-glucoside is readily available, it may be employed as a starting material, and obviously, if butyl glucoside were available commercially, it could be employed as a starting material and the methyl glucoside omitted.

It is preferred to use an excess of methanol, or excess of butanol and an excess of the higher molecular weight alcohols to make sure all the glucose is converted to the desired glucoside. The yields of higher molecular weight alkyl glucosides are nearly quantitative in all cases. On a large scale, the methanol and butanol would be recovered. The excess higher molecular weight alcohol is readily recovered from the final product, generally by vacuum distillation. The molar ratio of higher alcohol to glucose can be from 8.0 to 1.0 to 1.0 to 1.0 and it is preferred to be from 4.0 to 1.0 to 1.5 to 1.0. In certain instances, where the higher molecular weight alcohol cannot be removed by distillation, it may be necessary to use an excess of glucose in order to drive the reaction to completion.

Typical of the higher molecular weight alcohols which can be employed in the present invention are n-dodecyl, n-tetradecyl alcohol, n-octadecyl alcohol, undecyl alcohol, tridecyl alcohol, octylphenoxypolyethoxyethanol containing 3 ethoxy groups, octylphenoxypolyethoxyethanol containing 5 ethoxy groups, laurylpolyethoxyethanol having 4 ethoxy groups, N-hydroxyethyl lauramide, n-decyl alcohol and n-octanol. In fact, any alcohol containing a primary alcohol group which falls in the molecular weight range of 130 to 435 is suitable. Alcohols containing secondary hydroxyl groups can also be used; however, the reaction is rather sluggish and the yields are lower.

Typical of secondary alcohols which may be employed are:

2-octanol
2,6,8-trimethyl-4-nonanol (trimethylnonyl alcohol)
2-methyl, 7-ethyl, 4-undecanol
2-methyl, 7-ethyl, 4-undecanol
6-dodecanol
3-ethyl, 6-undecanol
3,9-Diethyl, 6-tridecanol
5-ethyl, 2-nonanol
2,6-dimethyl, 4-heptanol.

Also of interest are the glucosides prepared from iso-decyl, iso-undecyl, iso-tridecyl alcohols, said alcohols being prepared by the oxo process, which process is well-known and the products thereof are commercially available.

In the examples which follow, XE–230 is a sulfonated styrene-divinylbenzene copolymer which has high divinylbenzene content. Amberlyst–15 is also a sulfonated styrene-divinylbenzene copolymer, but the divinylbenzene content is appreciably lower than that of XE–230. Both resins are characterized by having a macroreticular structure as hereinbefore described. The cross-linker content of these macroreticular-structured sulfonic type cation exchangers can be varied over a wide range and can be from 10 to 60% of the total weight of the copolymer. As pointed out hereinbefore, divinylbenzene represents a particularly preferred cross-linker, and it has been found that the efficiency of the catalyst depends in good part on the quantity of cross-linker present. The higher the cross-linker, the more effective is the resin as a catalyst, but this is true only of the macroreticular-structured resins. Thus, it is particularly preferred, particularly when considering divinylbenzene, to use 30 to 60% divinylbenzene.

Other sources of glucose can be employed, such as maltose, sucrose, disaccharides, and polysaccharides, containing the glucose moiety. These other sources must be hydrolyzable to glucose. Thus, syrups such as corn syrups, which contain glucose and maltose, prepared from the hydrolysis of starch, can be used. However, glucose is readily commercially available, and represents the preferred starting material.

The highly desirable surface activity of the higher alkyl-β-glucosides have been known since 1909–1911 when they were first prepared by Emil Fischer and co-workers. However, these highly desirable surface active agents have never become commerically available, due to the complexity of their synthesis. The present process makes it possible, for the first time, to prepare the higher alkyl-α-glucosides by a commercially feasible process.

The higher alkyl-α-glucosides are non-ionic surface-active materials which very effectively lower the surface tension of aqueous solutions. The following table illustrates this fact:

TABLE I

| Alkyl glucoside | γ in dynes/cm. | | | |
|---|---|---|---|---|
| | .001 | .01 | 0.1 | 1.0 |
| n-Octyl- | 53 | 37 | 29 | 21 |
| n-Decyl- | 58 | 36 | 27 | 26 |
| n-Dodecyl- | 36 | 24 | 22.5 | 22.5 |
| Iso-decyl- | | | 26 | |
| Iso-undecyl- | | | 26 | |
| Iso-tridecyl- | | | 24 | |
| Triton X–100 | 50 | 28.5 | 29.5 | 30.5 |

Triton X–100 is a commercially available non-ionic surface-active material of the octylphenoxypolyethoxyethanol type. The value of 22.5 dynes/cm. for the n-dodecyl glucoside at a concentration of 0.1% is about the theoretical limit for a hydrocarbon surfactant. This illustrates the very effective surface tension lowering of these materials.

The higher alkyl-α-glucosides are also effective at lowering the interfacial tension between water and oil. This fact is illustrated in the following table:

TABLE II

| Alkyl glucoside | Percent surfactant in aqueous phase | |
|---|---|---|
| | Interfacial tension v. atreol 9 in dynes/cm. | |
| | 0.1% | .01% |
| n-Octyl- | 7.9 | 25.3 |
| n-Decyl- | 1.7 | 16.8 |
| n-Dodecyl- | 1.7 | 3.1 |
| Triton X–100 | 2.5 | 10.0 |

The high foaming properties of the higher alkyl-α-glucosides, as compared to other surfactants is illustrated in the following table:

TABLE III

| Surfactant | Ross Miles Foam, 50° C. foam height (min.) 0.1%—minutes | | |
|---|---|---|---|
| | 0 | 5 | 10 |
| n-Decyl glucoside | 205 | 185 | 180 |
| Triton X–102 (octylphenoxypolyethoxyethanol, E₁₂) | 150 | 80 | 35 |
| Ultrawet 60K (sodium dodecylbenzene sulfonate) | 190 | 180 | 150 |

Regular Tergotometer Textile detergency tests run at 50° C. for 15 minutes at 100 r.p.m. gave the following results for the higher alkyl-α-glucosides as compared to Triton X–100:

TABLE IV

| 0.1% surfactant with 0.1% STPP* | Tergotometer, 50° C., 15 min., 100 r.p.m. Percent return to original whiteness | | | | | |
|---|---|---|---|---|---|---|
| | Cotton | | Wool | | Nylon | Viscose |
| | Oily | Dry | Oily | Dry | Oily | Oily |
| None | 52 | 43 | 45 | 46 | 79 | 59 |
| Triton X–100 | 58 | 58 | 96 | 56 | 87 | 78 |
| n-Decyl glucoside | 53 | 59 | 84 | 52 | 87 | 77 |
| n-Dodecyl glucoside | 57 | 57 | 100 | 79 | 88 | 78 |

*Sodium Tripolyphosphate.

As foam stabilizers the higher alkyl-α-glucosides are about equal to the alkanolamides such as "Alrosol."

They are effective in both non-ionic and anionic surfactants. This fact is illustrated in the following table:

TABLE V

| Surfactant | Ratio | Ross Miles Foam Heights, mm. minutes | | |
|---|---|---|---|---|
| | | 0 | 5 | 10 |
| Ultrawet K60 (NaDDBS) | | 135 | 120 | 120 |
| K60/Alrosol | 80/20 | 150 | 140 | 140 |
| K60/decylglucoside | 80/20 | 160 | 150 | 150 |
| K60/dodecylglucoside | 80/20 | 155 | 145 | 145 |
| Triton X-102 (OPE$_{12}$) | | 150 | 80 | 35 |
| Triton X-102/decylglucoside | 90/10 | 160 | 130 | 50 |
| | 75/25 | 180 | 75 | 75 |
| | 50/50 | 190 | 120 | 90 |
| Triton X-102/dodecylglucoside | 90/10 | 170 | 145 | 50 |
| | 75/25 | 180 | 170 | 160 |
| | 50/50 | 200 | 180 | 180 |

When the standard "Draves wetting" and the "Floating patch" tests are run on the glucosides, the following results are obtained:

TABLE VI

| Surfactant | Draves 25 C., Conc. for 25 sec., WOT | Floating Patch, Conc. for 25 sec., WOT |
|---|---|---|
| Decyl glucoside | .058 | .095 |
| Dodecyl glucoside | .10 | .105 |
| Sodium lauryl sulfate | .07 | |
| Triton X-100 | .05 | .25 |

Note.—"WOT" is wetting-out time.

This data shows that the higher alkyl-α-glucosides have wetting properties similar to some of the commercial wetting agents.

In testing as emulsifiers, the glucosides were tested in 100 ml. of 60/40 water/solvent (volume ratio), at 5% surfactant based on the solvent. In the following table, the symbols stand for the following:

P—poor emulsifier, 5 ml. separation in 1 hr.
F—fair emulsifier, 0–5 ml. separation in 1 hr.
G—good emulsifier, no separation in 1 hr.

TABLE VII

| Surfactant | Emulsification | | | | |
|---|---|---|---|---|---|
| | Textilene 50 | Kerosene | Xylene | Dibutyl phthalate | Ethylene dichlor. |
| n-Octyl glucoside | F | F | G | G | G |
| n-Decyl glucoside | P | P | G | G | G |
| n-Dodecyl glucoside | P | P | G | P | G |
| Triton X-100 | F | F | G | G | P |
| Triton X-114 | F | G | G | G | P |

The solvent Textilene 50 is a highly aliphatic commercial solvent. The emulsion using n-decyl-α-glucoside in ethylene dichloride was stable for more than 10 days.

Recent attention has been focused on the potential hazard of surface active agents in drinking water and on detergent-caused foam in sewage plants and in streams.

Biodegradability tests with n-decyl glucoside in raw river water gave a rapid degradation as evidenced by a drop in foaming characteristics. In this test, the surfactant at 5 p.p.m. is mixed with 100 ml. of raw river water and placed in a sealed 8 oz. jar and allowed to stand at 25° C. The sample is shaken violently and the foam measured. As the material degrades, due to bacterial action, the foaming tendency will disappear. From the following table, it can be seen that the n-decyl-α-glucoside is rapidly degraded when compared to other surfactants.

TABLE VIII

| Surfactant | Initial | Percent of surface covered by foam after 1 minute after storage for the following number of days | | | | |
|---|---|---|---|---|---|---|
| | | 1 | 2 | 3-5 | 19-21 | 28-30 |
| None | 0 | 0 | 0 | 0 | 0 | 0 |
| n-Decyl glucoside | 100 | 30 | 5 | 0 | | |
| Alkylphenyl (polyethoxy) ethanol containing 9 ethoxy groups | 100 | 100 | 100 | 100 | 95 | 70 |
| Sodium dodecylbenzene sulfonate | 100 | 100 | 100 | 55 | 60 | 30 |
| oxo-Tridecyl-E$_7$ | 100 | 100 | 100 | 100 | 100 | 100 |
| Stearyl EO$_{30}$ | 100 | 100 | 100 | 100 | 100 | 100 |

Thus, is can be seen that the higher alkyl-α-D-glucosides as prepared in this application are rapidly "biodegradable."

It is anticipated that the higher alkyl glucosides would be non-toxic, since they are derived from a base compound which is a foodstuff, and this base compound is altered by the addition of groups which are known to be substantially physiologically inactive. It is proposed to use the glucosides as surface-active compounds in foodstuffs, cosmetics, and pharmaceutical preparations.

*Example 1*

PREPARATION OF n-TETRADECYL GLUCOSIDE

To a two-liter, three-necked, round bottom flask equipped with a mechanical stirrer, a thermometer, a dropping funnel (250 ml.) and a distillation head there were charged 97.1 grams (0.5 mole) α-methyl glucoside, 2.0 grams (0.011 mole) glucose, 50 grams XE-230 (vacuum-dried) and 400 ml. (309 grams, 9.64 moles) methanol. This mixture was heated with stirring to reflux (75° to 80° C.) and there were slowly added 400 ml. (328 grams, 4.42 moles) n-butanol from the dropping funnel while the methanol is recovered at the same rate through the distillation head. (This addition usually requires 4 to 5 hours.) When no more methanol could be removed at a reaction temperature below 100° C., there were added 428.8 grams (2.0 moles) n-tetradecyl alcohol. A slight vacuum was applied to the apparatus, such that the n-butanol refluxed very slowly. The n-butanol was removed through the distillation head, over a four-hour period, while the reaction temperature was maintained at 85° to 95° C. (recovered 91% of the n-butanol). When no more n-butanol can be removed under vacuum (ca. 10–20 mm.) at a reaction temperature of 95° C., cool the reaction mixture to 50° to 60° C., release the vacuum and dilute the reaction mixture with 500 ml. of n-heptane. This mixture is filtered to remove the catalyst beads (XE-230). Stir the catalyst beads with warm dimethylformamide for one hour and again filter. Combine the filtrates. Add 5 grams of anhydrous calcium hydroxide to the filtrate and stir this mixture for one hour at room temperature, to neutralize any acidic material leached from the beads. Filter the solution to remove the insoluble calcium salts. Strip the filtrate under a vacuum of 10–20 mm. to remove the heptane and dimethylformamide, then strip the residue under high vacuum (<1 mm.) to remove the excess n-tetradecyl alcohol. (Recovered 330 grams or 77% of alcohol charged.) The residue (157.4 grams) was a light brown wax-like material. It represents an 84% crude yield.

This material was purified by repeated extractions with hot acetone. Evaporation of the acetone solution gave 111.5 grams of a light tan wax-like material which slowly crystallized to a micro-crystalline wax.

*Analysis.*—Calculated for $C_{20}H_{40}O_6$: C, 63.79; H, 10.71%. Found: C, 63.55; H, 10.51%.

Sample shows specific rotation (4% methanol) = $\alpha_D^{25} = +41.26°$.

Example II

PREPARATION OF n-OCTADECYL GLUCOSIDE

In a one-liter flask equipped as in Example I charge 97.1 grams (0.5 mole) α-methyl glucoside, 5 grams (.028 mole) glucose, 400 ml. (309 grams, 9.64 moles) methanol, and 50 grams Amberlite XE–230 (vacuum-dried). Heat this mixture to reflux for 2 hours with stirring to dissolve the glucose and α-methyl glucoside. After the material is homogeneous (glucose dissolved), add 400 ml. (4.42 moles) n-butanol from the dropping funnel while methanol is removed through the distillation head, over a period of two hours. The distillation of methanol was continued until no more methanol could be removed at a reaction temperature of 85 to 90° C. When all the methanol was removed, 541 grams (2.0 moles) n-octadecanol was added and a slight vacuum applied to cause the n-butanol to reflux at a reaction temperature of 90° to 95° C. The n-butanol was removed from the reaction mixture through the distillation head, under a slight vacuum, while the reaction temperature was maintained at 90° to 95° C. (over a seven-hour period). At the end of this time, the reaction mixture was cooled to 60° C., the vacuum released and the reaction mixture diluted with 400 ml. of n-heptane. This solution was filtered to remove the catalyst. The catalyst was washed with heptane and the combined filtrates mixed with 5 grams calcium hydroxide and stirred one hour. This solution was filtered to remove the insoluble calcium materials and stripped under vacuum (20 mm.) to remove the heptane, and then under high vacuum (<1.0 mm.) to remove the unreacted n-octadecanol. The residue (74 grams) was recrystallized once from acetone and once from heptane. The resulting light brown waxy solid amounted to 42.8 grams.

*Analysis.*—Calculated for $C_{24}H_{48}O_6$: C, 66.62; H, 11.18%. Found: C, 64.73; H, 10.83%.

Sample shows specific rotation (4% butanol) = $\alpha_D^{25} = +48.63°$.

Example III

PREPARATION OF UNDECYL-(BRANCHED CHAIN) GLUCOSIDE

In a two-liter flask equipped as in Example I was charged 97.1 grams (0.4 mole) α-methyl glucoside, 2.0 grams (.011 mole) glucose, 400 ml. (309 grams, 9.64 moles) methanol and 50 grams Amberlite XE–230 (vacuum-dried). This mixture was heated to reflux (65° to 70°) and 400 ml. (328 grams, 4.42 moles) n-butanol added slowly, with stirring while the methanol was removed through the distillation head (6½ hours). At the end of this time, a slight vacuum was applied to cause the n-butanol to reflux at a temperature of 70° to 80° C. To this boiling mixture was added 689.2 grams (4.0 moles) of a branched chain, oxo-undecyl alcohol, slowly from the addition funnel while n-butanol was removed from the reaction mixture through the distillation head. When all the n-butanol was removed (4 hours) the reaction mixture was cooled to 50° C., the vacuum released and the solution filtered to remove the catalyst. The filtrate was stirred with 5 grams calcium hydroxide and again filtered. The filtrate was stripped under vacuum to remove the unreacted undecyl alcohol. The residue (109.5 grams; 65% crude yield) was an amber colored syrup. This crude product was purified by dissolving in aqueous methanol and extracting with heptane. The aqueous methanol solution was stripped giving 86.8 grams purified water-soluble product.

*Analysis.*—Calculated for $C_{17}H_{34}O_6$: C, 61.05; H, 10.24%. Found: C, 65.15; H, 11.12%.

Sample shows specific rotation (4% in methanol) = $\alpha_D^{25} = +34.00°$.

Example IV

The procedure and apparatus described in Example I were used. The amounts of materials charged were:

97.1 grams (0.5 mole) α-methyl glucoside
2.0 grams (0.11 mole) glucose
400 ml. (300 grams, 9.64 moles) methanol
50 grams XE–230 (vacuum-dried)
400 ml. (328 grams, 4.42 moles) n-butanol
800 grams (2.17 moles) tridecyl alcohol Recovered 89% of the methanol and n-butanol. The product was isolated as before and there was obtained 176.5 grams crude yield (97% crude yield). Recovered 558.5 grams tridecyl alcohol (90% of the excess charged).

The crude product was purified by dissolving it in chloroform, filtering to remove any insoluble material, washing the chloroform solution with water, and evaporating the chloroform. The resulting brown viscous syrup was water-soluble to give a slightly cloudy solution showing a high stable foam.

*Analysis.*—Calculated for $C_{19}H_{38}O_6$: C, 62.95; H, 10.56%. Found: C, 67.17; H, 11.33%.

This analysis shows the presence of some unreacted tridecyl alcohol (ca. 5%).

Sample shows a specific rotation (2% in methanol) = $\alpha_D^{25} = +42.91°$.

Example V

PREPARATION OF OCTYLPHENOXYPOLYETHOXYETHANOL (HAVING 4 ETHOXY GROUPS) GLUCOSIDE

Since octylphenoxypolyethoxyethanol (having 4 ethoxy groups) is a non-volatile alcohol, this preparation was run using an excess of α-methyl glucoside.

The apparatus and procedure were the same as in previous experiments. The charge was as follows:

145.6 grams (0.75 mole) α-methyl glucoside
2.0 grams (0.011 mole) glucose
50 grams Amberlyst–15 (vacuum-dried)
400 ml. (309 grams, 9.64 moles) methanol
600 ml. (492 grams, 6.63 moles) n-butanol
213.3 grams (0.5 mole) actylphenoxypolyethoxyethanol.

The reaction was carried out as previously described at 85° to 90° for 14 hours. Recovered 95% of the methanol and 95% of the n-butanol charged. The product was worked up as follows:

After removal of the n-butanol the reaction mixture was dissolved in dimethylformamide, filtered to remove the catalyst (Amberlyst–15), neutralized to pH 7.0, and stripped under vacuum to remove the dimethylformamide. The residue was dissolved in acetone, filtered to remove unreacted glucose and α-methyl glucoside, and the acetone evaporated giving 192 grams (65.2% yield) of dark brown syrup which gives a cloudy water solution showing a high stable foam.

*Analysis.*—Calculated for $C_{30}H_{52}O_{11}$: C, 61.20; H, 8.90%. Found: C, 63.20; H, 9.38%.

This analysis shows the presence of some unreacted octylphenoxypolyethoxyethanol (having 4 ethoxy groups). Sample shows a specific rotation (4% in methanol) = $\alpha_D^{25} = +16.38°$.

Example VI

PREPARATION OF OCTYLPHENOXYETHOXYETHOXYETHANOL GLUCOSIDE

This experiment was carried out as described in Example I using the following charge:

360.2 grams (2.0 moles) glucose
97.1 grams (0.5 mole) α-methyl glucoside
600 ml. (464 grams, 14.46 moles) methanol
400 ml. (328 grams, 4.42 moles) n-butanol
50 grams XE–230 (vacuum-dried)
400 ml. dimethylformamide
169.3 grams octylphenoxypolyethoxyethanol During the reaction, after stripping out the methanol, it was necessary to add dimethylformamide to keep the large excess of glucose dissolved in the system. This is the only change in the reaction procedure.

The crude product was isolated as usual by filtering to remove the catalyst, neutralization to pH 7.0, and stripping. The crude product was dissolved in acetone, filtered to remove the unreacted glucose and stripped. This product amounting to 149 grams (59.6% yield) was a pale amber viscous oil.

*Analysis.*—Calculated for $C_{26}H_{44}O_9$: C, 62.37; H, 8.86; OH No. 448.2. Found: C, 60.93; H, 9.19; OH No. 495.3.

Sample shows a specific rotation (4% in methanol) $=\alpha_D^{25}=+43.35°$.

*Example VII*

This reaction was carried out as previously described using the following charge:

45.5 grams (0.25 mole) glucose
2.0 grams (0.010 mole) α-methyl glucoside
309 grams (9.64 moles) methanol
50 grams XE–230
328 grams (4.42 moles) n-butanol
259 grams (0.637 mole) laurylpolyethoxyethanol (having 4 ethoxy groups)

During the reaction, 98% of the expected methanol and n-butanol were recovered. The product was isolated as follows:

The reaction mixture was diluted with dimethylformamide, filtered to remove the catalyst, neutralized and stripped. The crude product weighing 286 grams was dissolved in acetone, filtered to remove unreacted glucose and α-methyl glucoside and stripped. The residue from this stripping operation was dissolved in water, extracted with heptane and again stripped giving 121.4 grams of product (82% yield).

*Analysis.*—Calculated for $C_{28}H_{56}O_{11}$: C, 59.12; H, 9.93%. Found: C, 61.6; H, 10.52%.

These results indicate the presence of a small quantity of unreacted laurylpolyethoxyethanol having 4 ethoxy groups. Sample shows specific rotation (4% in methanol) $=\alpha_D^{25}=+32.97°$.

*Example VIII*

PREPARATION OF GLUCOSIDE OF N-HYDROXYETHYL LAURAMIDE

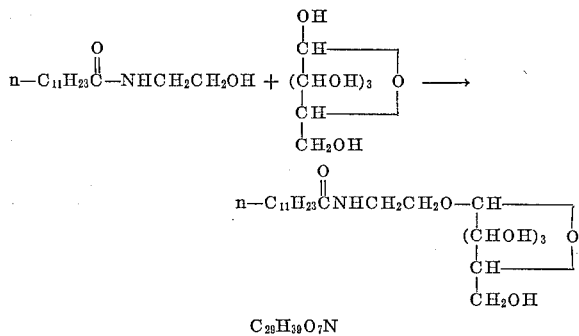

$C_{20}H_{39}O_7N$

To a 500 ml., three-necked round-bottom flask equipped with a mechanical stirrer, a reflux condenser and a thermometer, there were charged 24 grams (0.1 mole) of N-hydroxyethyl lauramide, 18.4 grams (0.1 mole) of glucose, 10 grams of XE–230 (vacuum-dried) and 300 ml. of isopropanol. This mixture was heated to reflux with stirring for 24 hours. The reaction mixture was cooled, filtered to remove the catalyst, neutralized to a pH of 7–8 and stripped. The residue (40 grams) was recrystallized from acetone. The resulting white waxy hydroscopic solid was soluble in hot water and showed a high foam.

*Analysis.*—Calculated for $C_{20}H_{39}O_7N$: N, 3.45%. Found: N, 4.56%.

*Example IX*

PREPARATION OF n-DECYLGLUCOSIDE

To a one-liter three neck, round-bottom flask equipped with a mechanical stirrer, a thermometer and a reflux condenser was charged 158.3 grams (1.0 mole) n-decyl alcohol, 90.1 grams (0.5 mole) glucose, 57 grams dry XE–230, and 400 ml. dimethylformamide. This mixture was then heated with stirring to 80° to 85° C. for 48 hours, the mixture was then filtered to remove the catalyst XE–230. The catalyst was then washed well with dimethylformamide and again filtered. The combined filtrates were neutralized to a pH 7.0 (used a pH meter) and mixed with 1000 ml. of water. This emulsion was placed in a 2-liter separatory funnel. The lower aqueous layer was separated and extracted once with heptane. The original oil layer was combined with the heptane washings and stripped at 10 mm. pressure to remove the heptane and then stripped to remove the unreacted decyl alcohol. The residue was dissolved in 30% aqueous methanol and extracted with heptane to remove the last traces of decyl alcohol. The methanol solution was then stripped giving 47.5 grams light tan wax-like solid (29.6% yield).

*Analysis.*—Calculated for $C_{16}H_{32}O_6$: C, 59.97; H, 10.06. Found: C, 58.06; H, 9.50.

*Example X*

PREPARATION OF n-DODECYLGLUCOSIDE

To a one liter, three neck round-bottom flask equipped with a mechanical stirrer, a thermometer and a reflux condenser was charged 90.1 grams (0.5 mole) anhydrous dextrose (glucose), 500 ml. dimethylformamide, 71 grams dry XE–230, and 372.6 grams (2.0 moles) n-dodecyl alcohol. This mixture was then heated with stirring to 80° for 24 hours, the reaction mixture was then cooled to 50° C. and filtered to remove the beads. The beads were stirred for 15 minutes with warm dimethylformamide and filtered. The filtrates were combined and neutralized to a pH of 6.5, diluted with 1000 ml. water and placed in a two-liter separatory funnel. The lower aqueous layer was separated and washed twice with heptane. The heptane was combined with the original oil layer and stripped under vacuum/10–15 mm. to remove the heptane and then under high vacuum to remove the excess n-dodecyl alcohol. The residue amounted to 39.5 grams of light tan wax (22.6% yield).

*Analysis.*—Calculated for $C_{18}H_{36}O_6$: C, 62.04; H, 10.14. Found: C, 61.93; H, 10.34%.

*Example XI*

PREPARATION OF n-DODECYLGLUCOSIDE

To a two liter, three neck flask, equipped with a mechanical stirrer, a thermometer, a dropping funnel (250 ml.), and a distillation head, charge 97.1 grams (0.5 mole) α-methyl-glucoside, 2.0 grams (0.011 mole) glucose, 58.5 grams XE–230 (vacuum-dried) and 400 ml. (309 grams, 9.64 moles) methanol. Heat this mixture to reflux (75° to 80°) with stirring and slowly add 400 ml. (328 grams, 4.42 moles) n-butanol from the dropping funnel while the methanol is removed at the same rate through the distillation head (this addition usually requires 4 to 5 hours). When no more methanol can be removed at a reaction temperature below 100° C. slowly add 745 grams (4.0 moles) n-dodecyl alcohol from the dropping funnel (at a reaction temperature of 80° to 90° C.) while pulling a very slight vacuum, so that the n-butanol is refluxing. Start removing the n-butanol from the distillation head at about the same rate as the dodecyl alcohol is added. Keep the temperature at 80° to 90° C. (this addition usually takes 4 to 5 hours). When all the n-dodecyl alcohol is added, slowly increase the vacuum until no more n-butanol can be removed at a reaction temperature of 85° to 95° C. When no more butanol can be removed, cool the mixture to 50° to 60° C., release the vacuum and filter the mixture to remove the catalyst. Wash the catalyst with heptane and combine this heptane with the first filtrate. Neutralize the combined filtrates to a pH of 7 to 9 and strip them under vacuum (10 to 15 mm.) to remove the heptane, and then under high vacuum (less than 1 mm.) to remove the excess n-dodecyl alcohol (recovered 620.5 grams of n-dodecyl alcohol, or 95.4% of the excess charged). The residue from this stripping operation amounted to 143.8 grams. It was a light brown wax-like material; it represents an 82.5% yield of product.

*Analysis.*—Calculated for $C_{18}H_{36}O_6$: C, 62.04; H, 10.14%. Found: C, 62.96; H, 10.65%.

This wax-like product was purified by several recrystallizations from acetone, giving a soft crystalline (wax-like) material showing a melting point of 75° to 133° (literature for n-dodecyl-$\beta$-glucoside=77° to 137°). It shows a specific rotation (4% in methanol of $\alpha=+45.1°$ indicating that it is the $\alpha$-isomer.

*Analysis.*—Calculated for $C_{18}H_{36}O_6$: C, 62.04; H, 10.14; glucose 51.6%. Found: C, 62.71; H, 10.55; glucose 52.2%.

Example XII

PREPARATION OF n-DECYLGLUCOSIDE

Into a two liter, three-neck round-bottom flask equipped with a mechanical stirrer, a thermometer, a dropping funnel and a distillation head, was charged 97.1 grams (0.5 mole) $\alpha$-methylglucoside, 2 grams (0.011 mole) glucose, 400 ml. (309 grams, 4.42 moles) methanol, and 65.6 grams dry XE-230. This mixture was heated, with stirring to reflux (70-80° C.), and 400 ml. (328 grams, 4.42 moles) n-butanol was added slowly from the dropping funnel. The n-butanol was added at about the same rate as the methanol was distilled (addn. took about 4 hours). After the butanol had been added, the mixture was heated at 90° to 98° until no more methanol could be removed. When all the methanol had been removed, a slight vacuum was applied to cause the butanol to slowly distill at a reaction temperature of 80 to 90° C. n-Decyl alcohol (689.2 grams, 4.0 moles) was then added from the dropping funnel at a rate equal to the distillation of the n-butanol (addition took 5 hours). The vacuum was then increased slowly to ca. 1 mm. (until nothing could be distilled at a reaction temperature of 90° to 95° C.). The reaction mixture was then cooled to 30° C. and the vacuum was released. This mixture was then filtered to remove the catalyst (XE-230). The filtrate was stirred with 5 grams calcium hydroxide (to remove any acids extracted from the catalyst), filtered and the filtrate was stripped under high vacuum (less than 1 mm.) to remove the excess n-decyl alcohol. (Recovered 543 grams n-decyl alcohol, or 90% of the excess charged.) The residue, a light amber wax-like material amounted to 150 grams (93.6% yield).

*Analysis.*—Calculated for $C_{16}H_{32}O_6$: C, 59.97, H, 10.06, glucose 56.20%. Found: C, 60.51, H, 9.91, glucose 56.22%.

This product was purified by dissolving in water, extracting with heptane, and steam stripping until no more decyl alcohol could be detected in the distillate. The residue from this steam distillation was then stripped to dryness.

*Analysis.*—Calculated for $C_{16}H_{32}O_6$: C, 59.97; H, 10.06%. Found: C, 58.42; H, 9.67.

It gives a specific rotation (4% in methanol) of $\alpha=+60.86°$ indicating that it is the alpha ($\alpha$) isomer.

Example XIII

PREPARATION OF n-OCTYLGLUCOSIDE

In a one-liter, three-neck flask, equipped as above was charged 90.1 grams (0.5 mole) glucose, 2.1 grams (.011 mole) $\alpha$-methylglucoside, 400 ml. (309 grams, 9.64 moles) methanol, and 50 grams dry XE-230. This mixture was refluxed for 2 hours with stirring and 400 ml. (4.42 moles) n-butanol was then added slowly from the dropping funnel while methanol was removed through the distillation head, over a period of two hours. The distillation of methanol was continued until no more methanol could be removed at a reaction temperature of 80° to 85° C. When all of the methanol was removed, a slight vacuum was applied (to cause the n-butanol to reflux) and 520 grams (4.0 moles) of n-octyl alcohol was added slowly from the dropping funnel while n-butanol was removed from the distillation head (required 3 hours). The reaction was then cooled to room temperature, vacuum released and the mixture filtered to remove the catalyst. The filtrate was stirred for one hour with calcium hydroxide (hydrated lime) and again filtered. The filtrate was then stripped under high vacuum to remove the excess n-octyl alcohol (recovered 417.3 grams or 91.7% of excess charged). The residue was dissolved in 500 ml. of water and again stripped to dryness in order to remove the last traces of n-octyl alcohol. Yield=128 grams (87.6% yield).

*Analysis.*—Calculated for $C_{14}H_{28}O_6$: C, 57.51, H, 9.65, glucose 61.6%. Found: C, 56.04, H, 9.25, glucose 63.1%.

Example XIV

PREPARATION OF GLUCOSIDE OF TRIMETHYLNONYL ALCOHOL (2,6,8-TRIMETHYL-4-NONANOL)

The apparatus as described in Example I was used. The following materials were charged:

(A)

| | |
|---|---|
| $\alpha$-methyl glucoside | 97.1 grams (0.5 mole). |
| Glucose | 5.0 grams (0.0277 mole). |
| Methanol, 400 ml. | 309 grams (9.64 moles). |
| XE-230 (vacuum-dried) | 50 grams. |

(B)

| | |
|---|---|
| n-Butanol, 400 ml. | 328 grams (4.4 moles). |

(C)

| | |
|---|---|
| Dimethylformamide | 150 grams. |

(D)

| | |
|---|---|
| 2,6,8-trimethyl-4-nonanol | 358 grams (1.92 moles). |

The addition of n-butanol, with distillation of methanol, required 10 hours. The addition of trimethyl nonyl alcohol with distillation of n-butanol required 14 hours. During the distillation of the n-butanol it was necessary to add some dimethylformamide to keep the reaction mixture in solution. A theoretical recovery of volatile material (methanol and n-butanol) was obtained. The reaction mixture was filtered to remove the catalyst, the catalyst was washed with dimethylformamide. The combined filtrates were stirred for one hour with calcium hydroxide, and again filtered. The filtrate was then concentrated on the steam bath under a vacuum (10-20 mm.) to remove the dimethylformamide and then under a vacuum (<1.0 mm.) to remove the excess trimethyl nonyl alcohol. Recovered 288 grams of trimethyl nonyl alcohol (80.4% of that charged). The residue was a light brown glass-like solid which was quite water-soluble and showed a high unstable foam. It amounted to 70 grams or a 40.2% crude yield.

I claim:

1. A process for the preparation of high molecular weight glucosides which comprises reacting a saccharide selected from the group consisting of glucose and a source of glucose, with a high molecular weight alcohol in the presence of a macroreticular-structured sulfonic acid type cation exchange resin which is anhydrous and in the acid form, the alcohol having the type formula ROH in which R is a member of the class consisting of the following:

(a) normal alkyl from $C_8$ to $C_{18}$,
    (b) branched chain primary and secondary alkyl from $C_8$ to $C_{18}$, and (c) $R'O(C_2H_4O)_x$, where R' is a member of the class consisting of normal alkyl from $C_8$ to $C_{18}$, branched alkyl from $C_8$ to $C_{18}$, and alkyl phenyl in which the alkyl groups can be a total of $C_8$ to $C_{12}$, and $x$ represents an integer of 1 to 8.

2. A process as set forth in claim 1 in which the reaction temperature is from 60° to 100° C.

3. A process as set forth in claim 1 in which the reaction is carried out in an inert solvent.

4. A process as set forth in claim 3 in which the solvent is dimethylformamide.

5. A process for the preparation of high molecular weight glucosides in which glucose is reacted with methanol and the resulting product is reacted with butanol and the resulting product is reacted with a higher molecular weight alcohol in the presence of a macroreticular-structured sulfonic acid type cation exchange resin in the anhydrous and acid form.

6. A process as set forth in claim 5 in which the higher molecular weight alcohol is selected from the group consisting of branched chain primary and secondary alcohols containing 8 to 18 carbon atoms, ethylene oxide adducts of normal and branched chain alcohols containing 8 to 18 carbon atoms and 1 to 8 moles of ethylene oxide and ethylene oxide adducts of alkyl phenols in which the alkyl moiety is selected from the group consisting of mono- and di-alkyl containing 8 to 12 carbon atoms and are normal and branched chain alkyl groups.

7. Glucosides selected from the group consisting of
(a) compounds of the formula $$R-C_6H_4O(CH_2CH_2O)_n-C_6H_{11}O_5$$

in which R is alkyl from $C_8$ to $C_{18}$ and $n$ is an integer 2 to 8, and (b) compounds of the formula $$R-O-(CH_2CH_2O)_n-C_6H_{11}O_5$$

in which R is alkyl from 8 to 18 and $n$ is an integer from 2 to 8.

8. Octylphenoxypoly(ethoxy)ethyl glucoside containing 4 ethoxy groups.

9. Octylphenoxypoly(ethoxy)ethyl glucoside containing 3 ethoxy groups.

10. Laurylpoly(ethoxy)ethyl glucoside containing 4 ethoxy groups.

11. Laurylpoly(ethoxy)ethyl glucoside containing 7 ethoxy groups.

12. Octylphenoxypoly(ethoxy)ethyl glucoside containing 2 ethoxy groups.

13. Dodecylphenoxypoly(ethoxy)ethyl glucoside containing 7 ethoxy groups.

14. Dinonylphenoxypoly(ethoxy)ethyl glucoside containing 7 ethoxy groups.

15. Stearylpoly(ethoxy)ethyl glucoside containing 7 ethoxy groups.

16. Iso-tridecylpoly(ethoxy)ethyl glucoside containing 5 ethoxy groups.

References Cited by the Examiner
UNITED STATES PATENTS

| | | | |
|---|---|---|---|
| 2,049,758 | 8/1936 | Bertsch et al. | 260—210 |
| 2,235,784 | 3/1941 | White | 260—210 |
| 2,606,186 | 8/1952 | Dean et al. | 260—210 |
| 2,677,700 | 5/1954 | Jackson et al. | 260—488 |
| 3,053,830 | 9/1962 | Gaertner | 260—210 |
| 3,085,085 | 4/1963 | Wismer et al. | 260—210 |

LEWIS GOTTS, *Primary Examiner.*